(12) United States Patent
Carter

(10) Patent No.: US 8,305,928 B2
(45) Date of Patent: Nov. 6, 2012

(54) METHOD FOR SUPPORTING MULTIPLE DEVICES FROM A BROADBAND CONNECTION

(75) Inventor: Wade Carter, Snellville, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1001 days.

(21) Appl. No.: 12/206,689

(22) Filed: Sep. 8, 2008

(65) Prior Publication Data

US 2009/0067412 A1 Mar. 12, 2009

Related U.S. Application Data

(60) Provisional application No. 60/970,665, filed on Sep. 7, 2007.

(51) Int. Cl.
*H04L 12/28* (2006.01)

(52) U.S. Cl. ...................... 370/254; 370/395.3

(58) Field of Classification Search ........................ None
See application file for complete search history.

(56) References Cited

U.S. PATENT DOCUMENTS

| | | | |
|---|---|---|---|
| 2003/0069948 A1* | 4/2003 | Ma et al. ........................ | 709/220 |
| 2005/0201381 A1* | 9/2005 | Abbasi et al. ............ | 370/395.21 |
| 2006/0045068 A1* | 3/2006 | Wu et al. ........................ | 370/352 |
| 2010/0046531 A1* | 2/2010 | Louati et al. .................. | 370/401 |

* cited by examiner

*Primary Examiner* — Gregory Sefcheck
*Assistant Examiner* — Daniel Mitchell
(74) *Attorney, Agent, or Firm* — Troy A. Van Aacken; Robert J. Starr

(57) ABSTRACT

A method adds a MAC address per line for a multiline EMTA. After the EMTA initializes, the method creates "Virtual MTA" instances corresponding to each analog line/MAC address. The method facilitates MTA emulation of each of the Virtual MTA instances. For each virtual EMTA line, the emulation method includes acquiring an IP address via DHCP and acquiring a configuration file via TFTP for each virtual MTA instance.

12 Claims, 4 Drawing Sheets

METHOD FOR SUPPORTING MULTIPLE DEVICES FROM A BROADBAND CONNECTION

CROSS REFERENCE TO RELATED APPLICATION

This application claims priority under 35 U.S.C. 119(e) to U.S. provisional patent application No. 60/970,665 entitled "Multi-line virtual MTA," which was filed Sep. 7, 2007, and is incorporated herein by reference in its entirety

TECHNICAL FIELD

The claimed subject matter relates to communications networks, and more particularly, to providing separate service to multiple communication devices from a single broadband connection.

BACKGROUND

In currently deployed broadband communication network systems, billing systems have a limitation in that they associate a Media Access Control ("MAC") address of a Media Terminal Adaptor ("MTA") MAC address with a "customer," or subscriber. Because of this one-to-one association of customer to MTA MAC address, a service provider cannot separately bill multiple "customers," including individual persons or entities, from a Multi-line Embedded Media Terminal adaptor ("EMTA"). Even though multiple devices, or 'subscribers' can be coupled to a multi-line EMTA, current billing systems bill based on usage corresponding to the multi-line EMTA's MAC address. This presents a problem because the billing system does not separate usage by individual, and thus, for users who split a bill equally, a light user may pay as much as a heavy user without knowing they are paying more than their fair share.

FIG. 1 illustrates a block diagram of a communication device 2 that provides multiple telephony lines of service 4 to multiple devices from device; in the embodiment shown an EMTA device coupled to a hybrid fiber coaxial cable network 6. Device 2 includes typically cable modem ("CM") circuitry 8, and typical media terminal adaptor ("MTA") circuitry 10. As known in the art, CM circuitry comprises radio frequency circuitry for tuning to particular channels over an HFC network, and also include other circuitry and software to modulate and demodulate (i.e., MODEM) information carried across the network according to a communication protocol, typically quadrature amplitude modulation ("QAM"). In an EMTA, which includes CM circuitry and MTA circuitry, the MTA circuitry interfaces with the CM circuitry and provides processing of telephony signals between a telephone coupled thereto and the CM circuitry. The MTA circuitry performs such functions as providing a dial tone, sending a signal to a traditional telephone device that causes it to ring, compressing and decompressing voice signals, etc.

The CM circuitry 8 and the MTA circuitry 10 both have corresponding MAC addresses, 12 and 14 respectively. Every device manufactured has a unique MAC address for the CM and MTA portions, and thus, serves to distinguish to other devices, such as a cable modem termination system ("CMTS"), call management server ("CMS"), TFTP server, DHCP server, etc, the EMTA components from all others coupled to HFC 6. However, after EMTA 2 boots, other devices coupled to network 6 cannot distinguish any one of lines 4 from any other of lines 4.

With respect to the boot process of an EMTA, FIG. 2 illustrates typical steps known in the art for booting an EMTA. Therefore, detailed discussion of the boot process is not provided here, except to note that 'DS' and 'US' in the figure refers to 'downstream' and 'upstream' respectively. In addition, the figure refers to step 265 to distinguish it from a corresponding step discussed later with respect to FIG. 4.

Thus, based on the discussion above, the communication systems art needs a method and system that can determine usage of multiple entities that all couple to the same broadband connection device, such as a cable modem, MTA, EMTA, DSL modem, etc.

One solution has been to develop a chassis based multi-line EMTA. Essentially, a single housing includes circuitry for multiple MTAs inside, each basically a stand-alone device. Such an arrangement is bulky, costly, produces heat corresponding to the number of MTA circuits inside, and requires a large power supply.

Thus, there is a need for a method that provides support for multiple MTA lines from a singe broadband connection device that does not require significantly more power, physical space, connectors, etc. as compared to a single broadband connection device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
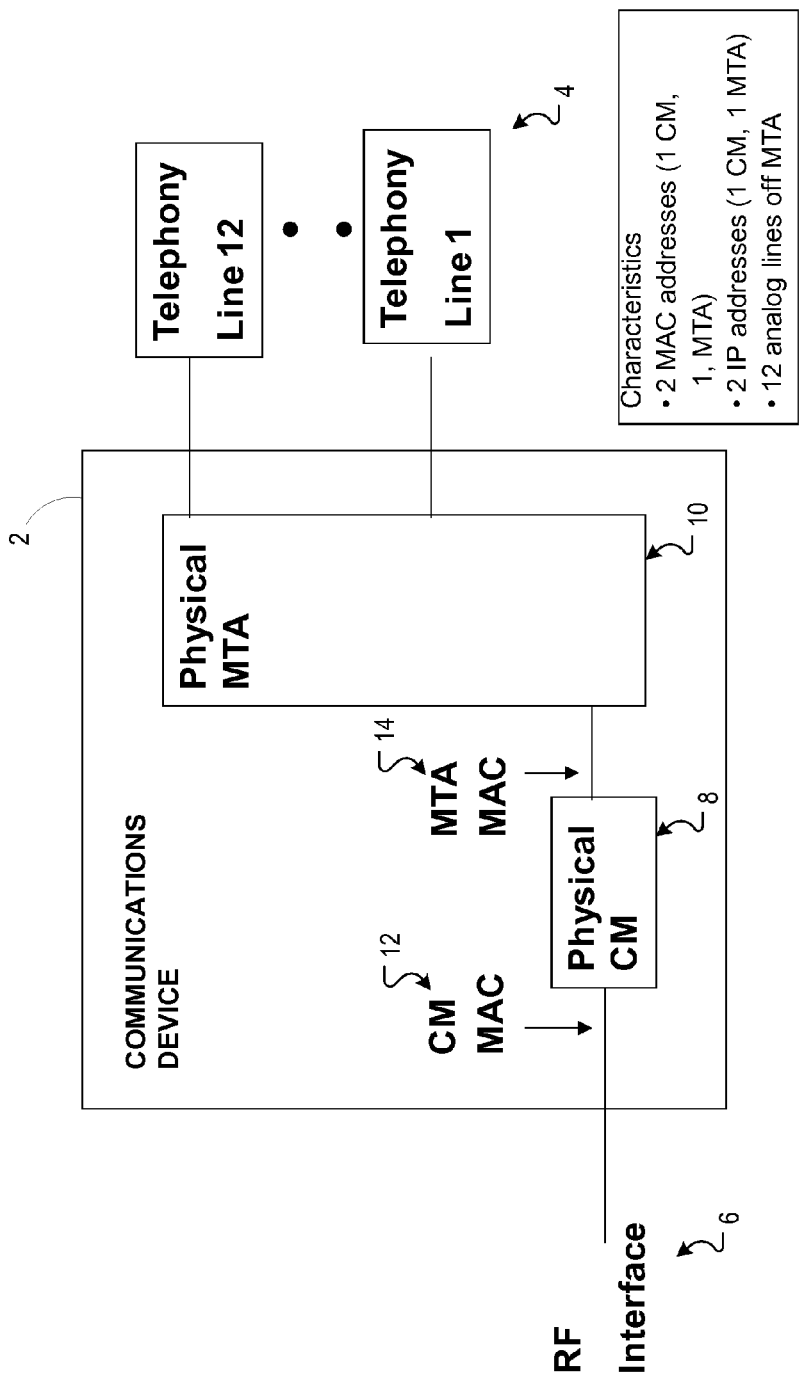
FIG. 1 illustrates a block diagram of a current implementation for providing multiple telephony lines from a single broadband connection device.
Figure 3:
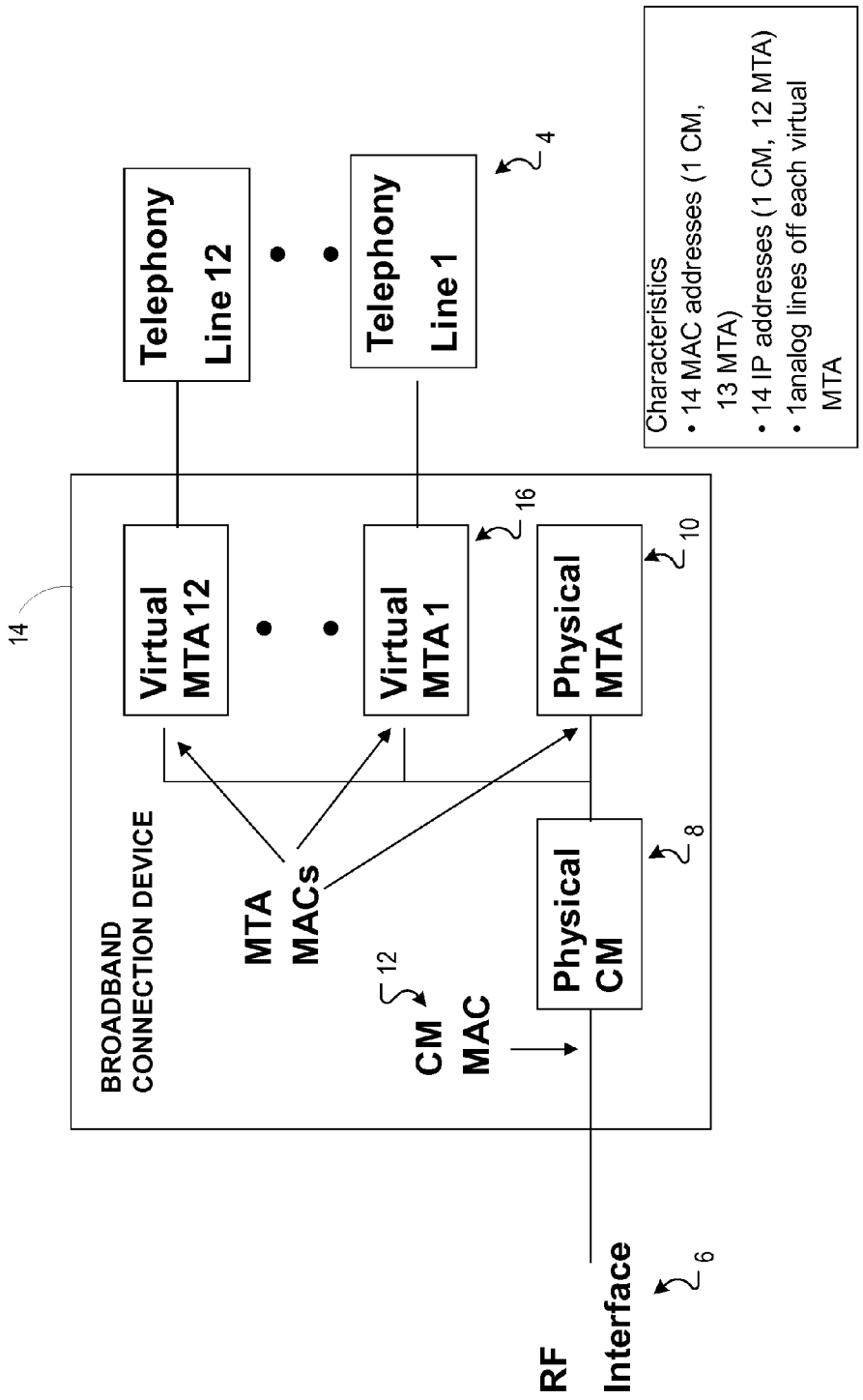
FIG. 3 illustrates a block diagram of a system that provides multiple MTA lines from a communication from multiple corresponding virtual MTA lines.

Turning now to the figures, FIG. 3 illustrates a broadband connection device 14 that couples to HFC 6 and provides telephony service to multiple lines 4, as illustrated in FIG. 1. Device 14 also includes CM circuitry 8 with a corresponding CM MAC address 12 as illustrated in FIG. 1. Using the same reference numbers in FIG. 3 and FIG. 1 indicates that these similarly referred-to components are similar, not that they are necessarily part of the same communication device, however, they could also refer to the same components in the same device. Device 14 also includes MTA circuitry 10 as illustrated in FIG. 1.

However, device 14 provides multiple virtual MTA instances, each coupled to a separate one of lines 4. Thus, usage over each of lines 4 can be tracked and billed separately from one another. FIG. 3 shows that physical, or actual, MTA device 10 does not provide service to any one of lines 4. Although MTA 10 performs the processing functions described above in the background section, device 14 does not associate the MAC of MTA 10 with any one of lines 4. Rather, a server coupled to HFC 6 assigns multiple internet protocol ("IP") addresses, in response to a request from MTA 10, to each of multiple virtual MTA instances 16. Thus, although each of lines 4 is physically coupled to MTA 10, MTA can allocate and customize the processing it performs between devices associated with each of virtual MTA instances 16.

Figure 2:
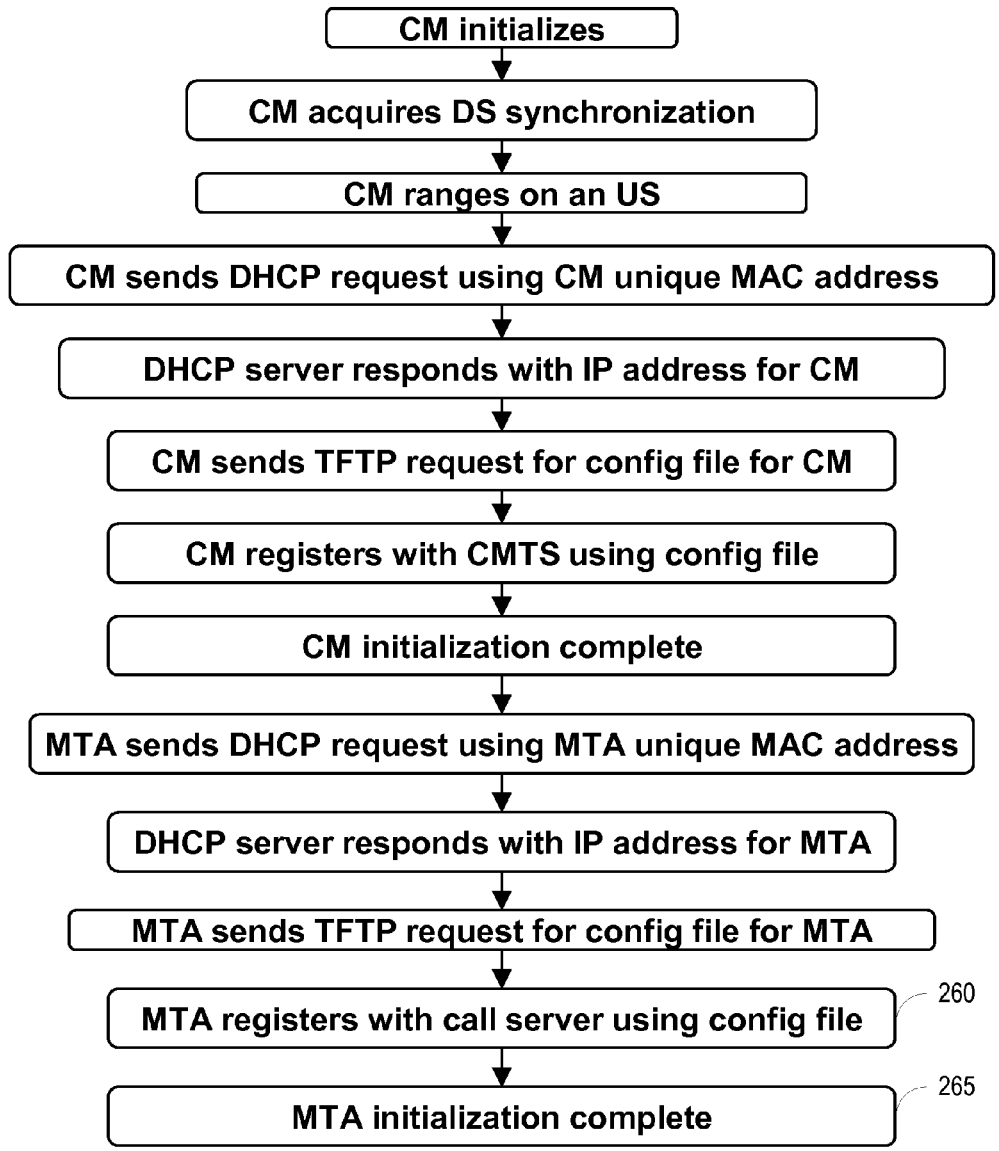
FIG. 2 illustrates a flow diagram of a method for configuring an EMTA communication device with one IP address and one MAC address for multiple EMTA lines.
Figure 4:
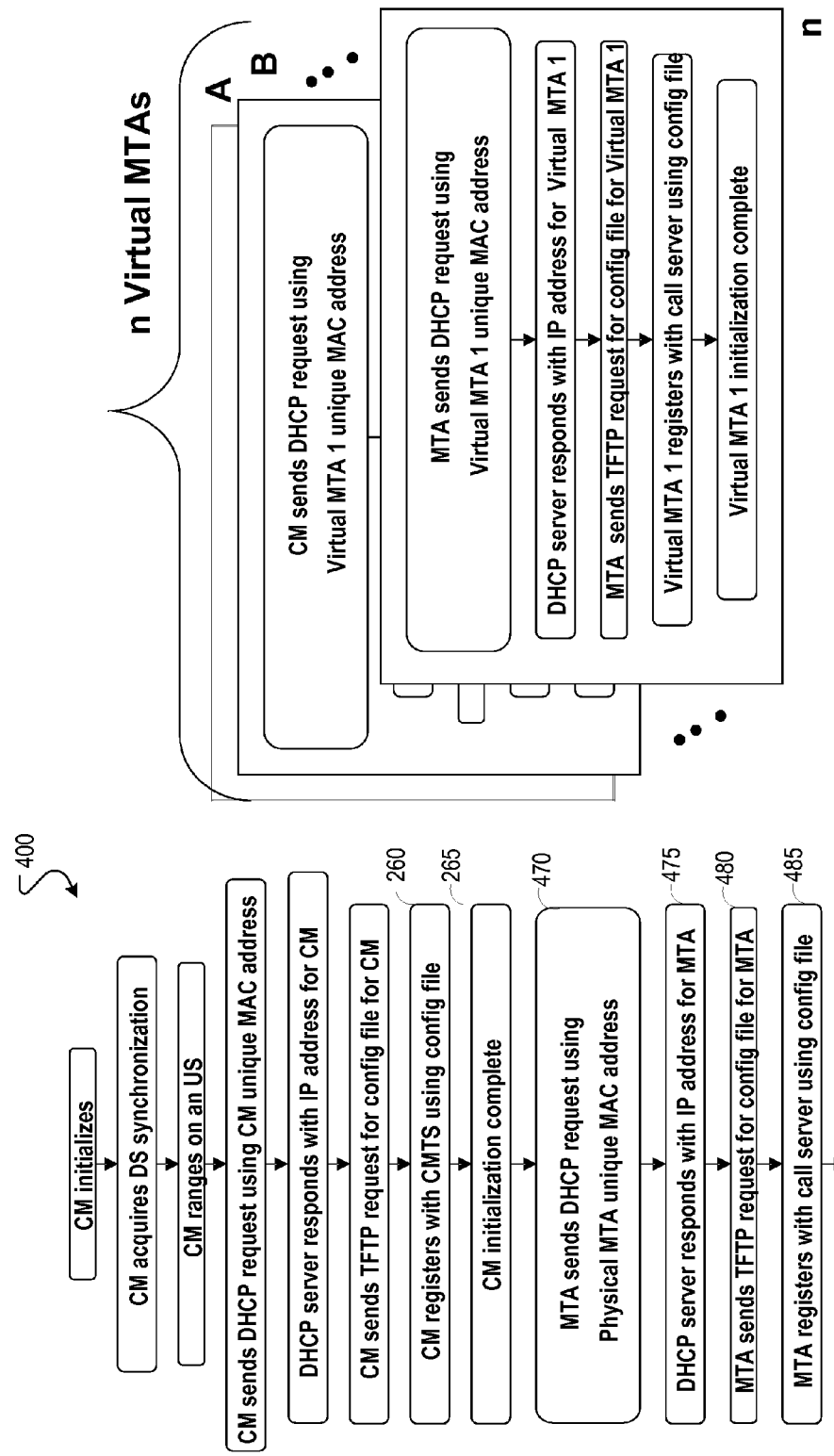
FIG. 4 illustrates a flow diagram of a method for configuring an EMTA communication device with separate IP addresses and separate MAC addresses for each of multiple virtual MTA lines.

Turning now to FIG. 4, method 400 refers to the last two similarly labeled steps of FIG. 2 for continuity. After the MTA of a communication device completes its initialization at step 265, the physical MTA transmits a DHCP request at step 470 over the HFC to which its corresponding CM circuitry is coupled. The DHCP request includes a MAC addresses that has been reserved, or generated in real time, for the first virtual MTA. The reserved MAC addresses for virtual MTAs may be stored in memory of the communication device at the time of manufacture, or may be downloaded to it after it has been placed into operation.

At step 475, a DHCP server coupled to the HFC responds with an IP address to be used in connection with the first of multiple virtual MTA instances. At step 480, the physical MTA sends a Trivial File Transfer Protocol ("TFTP") request for a configuration file for the first virtual MTA instance. At step 485, the first of multiple virtual MTA instances registers with a CMS using information in the corresponding configuration file received in response to the request at step 480 and the IP address received at step 475. Following registration with the CMS of the first virtual MTA instance, the physical MTA completes initialization of the first virtual MTA.

Depending on the number of virtual MTA lines that will be supported, the process beginning at step 470 repeats for each virtual MTA instance, until all virtual MTA instances that a given device needs to support have initialized.

As an implementation example of the method and system shown in the drawings and described relative thereto above, a telephony modem TM512 offered by ARRIS Group, Inc. The TM 512 can provide multiple virtual MTA instances using one physical MTA. With one CM MAC and thirteen MTA MAC addresses reserved for it, the single physical MTA can support twelve virtual MAC instances.

A management information base ("MIB") switch in the physical MTA configuration file can cause the EMTA to appear as a single EMTA with twelve lines or as twelve virtual MTA instances with one line per MTA instance. The physical MTA maintains an association between each virtual MTA instance and corresponding, and unique, MAC addresses and IP addresses. Thus, the physical MTA can facilitate full MTA provisioning and processing per virtual line (e.g., multiple and separate DHCP and TFTP sequences, etc. for each virtual line.)

Moreover, phone calls to and from devices associated with each of the virtual MTA lines use the virtual MAC and IP addresses so billing can be customized to reflect usage for each virtual MTA instance. In addition, simple network management protocol ("SNMP") commands can be sent to, and received from, and in connection with, each of the virtual MTA instances. Furthermore, operation personnel can use a graphical user interface ("GUI") over the internet to view statistics and information related to the physical MTA based on its MAC and IP addresses, or for any and all of the virtual instances using their respective and unique MAC and IP addresses.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. In a communication device having interface circuitry with its own unique identifier and processing circuitry with its own unique identifier, and after initializing the interface circuitry and the processor circuitry, a method for emulating one, or more, processing circuitry instances, comprising the steps:
   A. transmitting a DHCP (Dynamic Host Configuration Protocol) request using a selected MAC (Medium Access Control) address for a corresponding selected virtual MTA (Media Terminal Adaptor) instance;
   B. receiving a DHCP response that includes an IP (Internet Protocol) address assigned to the selected virtual MTA instance;
   C. transmitting a request for configuration information for the selected virtual MTA instance;
   D. receiving configuration information for the selected virtual MTA instance; and
   E. registering the selected virtual MTA with a call server using the received configuration file corresponding to the selected virtual MTA instance;
   repeating steps A through E for each of multiple virtual MTA instances supported by a single physical MTA of the device.

2. The method of claim 1 wherein the interface circuitry and the processing circuitry include cable modem circuitry and media terminal adaptor circuitry, respectively.

3. The method of claim 1 wherein the request for information includes a TFTP (Trivial File Transfer Protocol) request.

4. The method of claim 3 wherein the requested configuration information is a configuration file.

5. A network to which a communication device is coupled, the communication device having interface circuitry with its own unique identifier and processing circuitry with its own unique identifier, and after the interface circuitry and the processor circuitry have been initialized, the network facilitates a method for emulating one, or more, processing circuitry instances, the method comprising the steps:
   A. transmitting a DHCP (Dynamic Host Configuration Protocol) request using a selected MAC (Medium Access Control) address for a corresponding selected virtual MTA (Media Terminal Adaptor) instance;
   B. receiving a DHCP response that includes an IP address assigned to the selected virtual MTA instance;
   C. transmitting a request for configuration information for the selected virtual MTA instance;
   D. receiving a configuration information for the selected virtual MTA instance; and
   E. registering the selected virtual MTA with a call server using the received configuration information corresponding to the selected virtual MTA instance;

repeating steps A through E for each of multiple virtual MTA instances supported by a single physical MTA of the device.

6. The method of claim 5 wherein the interface circuitry and the processing circuitry include cable modem circuitry and media terminal adaptor circuitry, respectively.

7. The method of claim 5 wherein the request for information includes a TFTP (Trivial File Transfer Protocol) request.

8. The method of claim 7 wherein the requested configuration information is a configuration file.

9. A method, for facilitating a method that emulates one, or more, processing circuitry instances in a communication device coupled to a communication network having interface circuitry with its own unique identifier and processing circuitry, after the interface circuitry and the processor circuitry have been initialized, comprising the steps:
   A. receiving a DHCP (Dynamic Host Configuration Protocol) request associated with a selected MAC (Medium Access Control) address for a corresponding selected virtual MTA (Media Terminal Adaptor) instance of the communication device;
   B. transmitting a DHCP response that includes an IP address assigned to the selected MTA instance;
   C. receiving a request for configuration information for the selected virtual MTA instance;
   D. transmitting configuration information for the selected virtual MTA instance; and
   E. registering the selected MTA instance based on the transmitted configuration information corresponding to the selected MTA instance;
   repeating steps A through E for each of multiple MTA instances supported by a single physical MTA in the communication device.

10. The method of claim 9 wherein the interface circuitry and the processing circuitry include cable modem circuitry and media terminal adaptor circuitry, respectively.

11. The method of claim 9 wherein the transmitted configuration information includes a TFTP (Trivial File Transfer Protocol) request.

12. The method of claim 11 wherein the requested configuration information is a configuration file.

* * * * *